(12) United States Patent
Takaki et al.

(10) Patent No.: US 11,120,691 B2
(45) Date of Patent: Sep. 14, 2021

(54) SYSTEMS AND METHODS FOR PROVIDING WARNINGS TO SURROUNDING VEHICLES TO AVOID COLLISIONS

(71) Applicant: DENSO CORPORATION, Kariya (JP)

(72) Inventors: Ryo Takaki, Southfield, MI (US); Ting-Yu Lai, Ann Arbor, MI (US); Bo Sun, Farmington Hills, MI (US)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/700,411

(22) Filed: Dec. 2, 2019

(65) Prior Publication Data

US 2021/0166564 A1 Jun. 3, 2021

(51) Int. Cl.
*G01S 1/00* (2006.01)
*G08G 1/16* (2006.01)
*B60Q 1/52* (2006.01)

(52) U.S. Cl.
CPC ............ *G08G 1/167* (2013.01); *B60Q 1/525* (2013.01)

(58) Field of Classification Search
CPC .................................... B60Q 1/00; G01S 1/00
See application file for complete search history.

(56) References Cited

U.S. PATENT DOCUMENTS

| 3,660,811 A | 5/1972 | Vail et al. |
| 7,791,458 B2 | 9/2010 | Shimaoka et al. |
| 8,082,101 B2 | 12/2011 | Stein et al. |
| 9,744,903 B2 | 8/2017 | Malone et al. |
| 10,173,577 B2 | 1/2019 | Albou et al. |
| 10,343,601 B2 | 7/2019 | Wu |
| 2004/0085196 A1 | 5/2004 | Miller et al. |
| 2005/0195383 A1* | 9/2005 | Breed ...................... B60N 2/28 356/4.01 |
| 2006/0087416 A1 | 4/2006 | Kumabe et al. |
| 2009/0143986 A1* | 6/2009 | Stein ........................ B60T 7/22 701/301 |
| 2009/0256698 A1* | 10/2009 | Bonilla .................. B60Q 1/525 340/479 |
| 2014/0085106 A1 | 3/2014 | Clifford et al. |
| 2017/0178512 A1 | 6/2017 | Kannon et al. |
| 2018/0319328 A1 | 11/2018 | Takae et al. |

FOREIGN PATENT DOCUMENTS

| JP | 2009217495 A | 9/2009 |
| WO | 198901424 A1 | 2/1989 |

* cited by examiner

*Primary Examiner* — Shirley Lu
(74) *Attorney, Agent, or Firm* — Christopher G. Darrow; Darrow Mustafa PC

(57) ABSTRACT

System, methods, and other embodiments described herein relate to providing a warning from a subject vehicle to surrounding objects about a collision hazard. In one embodiment, a method includes identifying the surrounding objects of a subject vehicle according to sensor data about a surrounding environment of the subject vehicle. The method includes determining a collision probability indicating a likelihood of collision between a first object and a second object of the surrounding objects. The method includes, in response to the collision probability satisfying a collision threshold, communicating, by the subject vehicle, an alert to at least one of the surrounding objects about the collision hazard associated with the surrounding objects colliding.

20 Claims, 10 Drawing Sheets

SYSTEMS AND METHODS FOR PROVIDING WARNINGS TO SURROUNDING VEHICLES TO AVOID COLLISIONS

TECHNICAL FIELD

The subject matter described herein relates in general to systems and methods for providing warnings to surrounding vehicles and, more particularly, to determining when surrounding vehicles are likely to collide and using signaling abilities of a subject vehicle to communicate the threat of collision to the surrounding vehicle(s).

BACKGROUND

Vehicles may employ various safety systems to protect passengers, such as airbags, active/passive restraints, automated control assistance (e.g., anti-lock braking systems (ABS)), and so on. While these systems improve the safety of the passengers, they do not generally function to improve the safety of surrounding vehicles beyond attempting to avoid crashes of the instance vehicle. That is, the noted systems facilitate preventing crashes and/or protecting passengers against injury for the vehicle in which they are installed, but do not generally facilitate helping other vehicles in the surrounding environment avoid collision hazards.

Thus, surrounding vehicles are generally left to their own abilities in avoiding accidents. However, in various circumstances, an instant subject vehicle may have better situational awareness about, for example, potentially occluded hazards or other potential threats yet has no way in which to inform the surrounding vehicles of such threats. Moreover, the safety of the instant vehicle can be influenced by the operation of the surrounding vehicles. As such, there is generally a need to better inform the surrounding vehicles in order to further ensure the safety of the subject vehicle.

SUMMARY

In one embodiment, example systems and methods associated with providing alerts to surrounding vehicles to improve the safety of a subject vehicle are disclosed. As previously noted, surrounding vehicles of a subject vehicle may lack situational awareness about various collisions hazards, which can cause potential safety issues in a surrounding area including the subject vehicle. Therefore, in one embodiment, a disclosed system improves the safety of a subject vehicle and surrounding objects by communicating alerts about collision hazards to the surrounding objects. For example, in one embodiment, the disclosed system initially identifies the presence of the surrounding objects including, for example, pedestrians, vehicles, etc. From observed information about the objects such as positions and velocities, the disclosed system may determine whether the objects are likely to collide. Moreover, in a further approach, the disclosed system also determines blind spots associated with the various objects and can use the blind spots to further assess whether the objects are likely to collide.

In one approach, the disclosed system can quantify the likelihood of a collision hazard by computing a collision probability, and if the collision probability satisfies a collision threshold, the system can generate the noted alert. For example, the system may cause the subject vehicle to activate (e.g., flash in a defined pattern) rear hazards to communicate the collision hazard to one or more of the surrounding objects. In this way, the disclosed approach functions to improve the safety of the subject vehicle by assisting the surrounding vehicles in avoiding collision hazards.

In one embodiment, a collision warning system for providing a warning from a subject vehicle to surrounding objects about a collision hazard is disclosed. The collision warning system includes one or more processors and a memory that is communicably coupled to the one or more processors. The memory stores a detection module including instructions that when executed by the one or more processors cause the one or more processors to identify the surrounding objects of a subject vehicle according to sensor data about a surrounding environment of the subject vehicle. The detection module includes instructions to determine a collision probability indicating a likelihood of collision between a first object and a second object of the surrounding objects. The memory stores a warning module including instructions that when executed by the one or more processors cause the one or more processors to, in response to the collision probability satisfying a collision threshold, communicate, by the subject vehicle, an alert to at least one of the surrounding objects about the collision hazard associated with the surrounding objects colliding.

In one embodiment, a non-transitory computer-readable medium for providing a warning from a subject vehicle to surrounding vehicles about a collision hazard is disclosed. The computer-readable medium stores instructions that when executed by one or more processors cause the one or more processors to perform the disclosed functions. The instructions include instructions to identify surrounding objects of a subject vehicle according to sensor data about a surrounding environment of the subject vehicle. The instructions include instructions to determine a collision probability indicating a likelihood of collision between a first object and a second object of the surrounding objects. The instructions include instructions to, in response to the collision probability satisfying a collision threshold, communicate, by the subject vehicle, an alert to at least one of the surrounding objects about the collision hazard associated with the surrounding objects colliding.

In one embodiment, a method of providing a warning from a subject vehicle to surrounding vehicles about a collision hazard is disclosed. In one embodiment, the method includes identifying surrounding objects of a subject vehicle according to sensor data about a surrounding environment of the subject vehicle. The method includes determining a collision probability indicating a likelihood of collision between a first object and a second object of the surrounding objects. The method includes, in response to the collision probability satisfying a collision threshold, communicating, by the subject vehicle, an alert to at least one of the surrounding objects about the collision hazard associated with the surrounding objects colliding.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
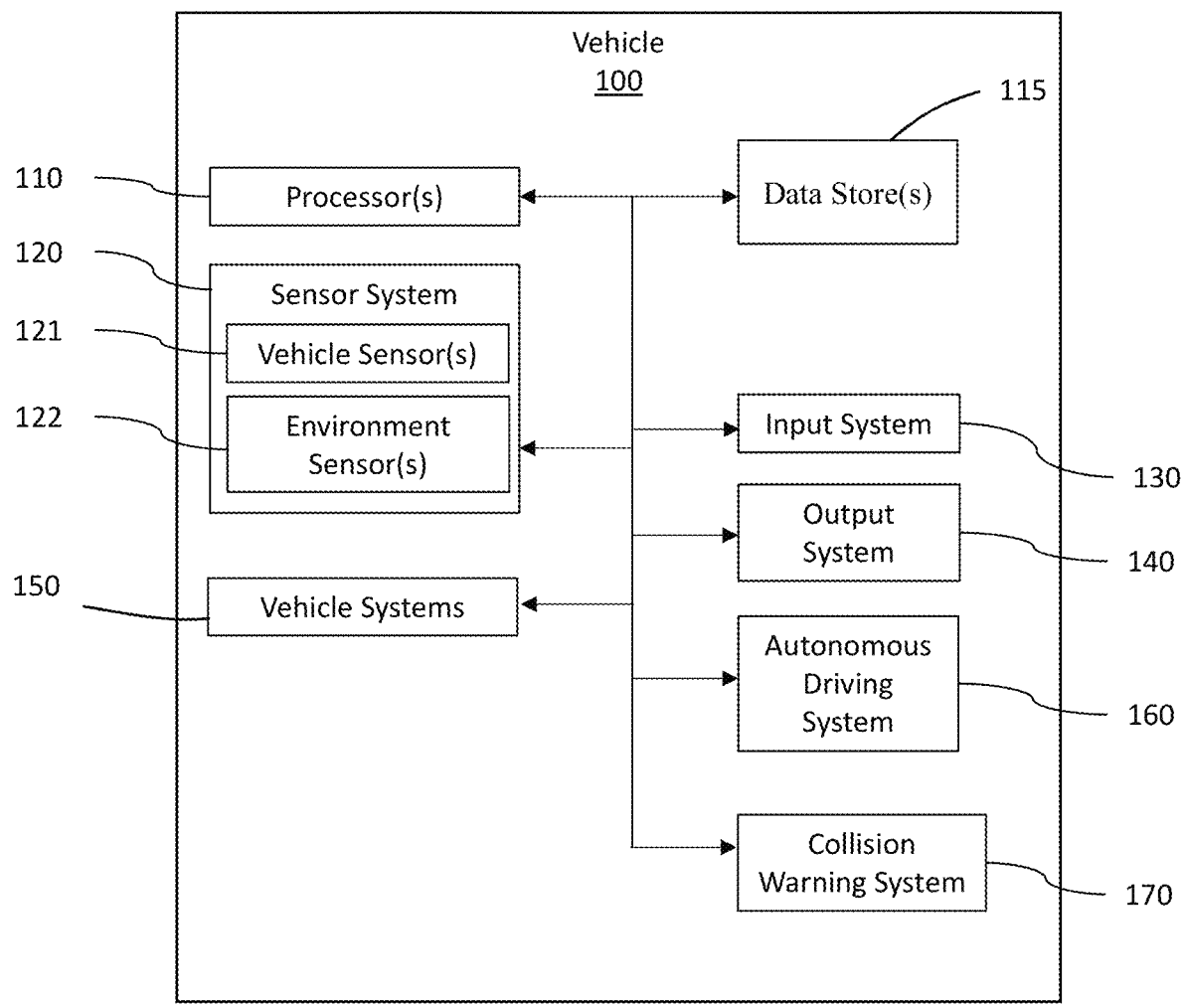
FIG. 1 illustrates one embodiment of a configuration of a vehicle in which example systems and methods disclosed herein may operate.

Systems, methods, and other embodiments associated with providing alerts to surrounding vehicles to improve the safety of a surrounding environment of a subject vehicle are disclosed. As previously noted, because surrounding objects (e.g., vehicles, pedestrians, etc.) may lack situational awareness about potential hazards, the objects may encounter dangerous situations that can negatively impact the surrounding objects and/or the subject vehicle. However, the subject vehicle may observe the potential hazards, including occluded obstacles, vehicles moving between blind spots of other vehicles, and so on. Yet, the subject vehicle generally has no mechanism for communicating this information about the hazards to the relevant surrounding objects. As such, the surrounding objects/vehicles may encounter dangerous circumstances that can affect the safety of the subject vehicle and the surrounding vehicles.

Therefore, in one embodiment, a disclosed system improves the safety of a subject vehicle and surrounding objects by communicating alerts about collision hazards to the surrounding objects. As an initial note, as used herein, the phrase "surrounding objects" is intended to encompass objects within a perceivable operating area around the subject vehicle. Moreover, the surrounding objects may include vehicles (e.g., automobiles, trucks, motorcycles, etc.) and non-vehicular objects such as pedestrians, bicyclists, and inanimate obstacles. In any case, in one or more embodiments, the disclosed approach generally includes identifying the presence of the surrounding objects and various observed information about the surrounding objects. From the observed information about the objects such as positions and velocities, the disclosed approach may determine whether the objects are likely to collide.

That is, in one aspect, the disclosed approach may undertake an analysis of the surrounding objects to estimate positions of the objects at separate points into the future. Where the estimated positions pass within a defined proximity, the disclosed approach may indicate different collision probabilities. For example, where the objects are estimated to overlap in their respective future positions (i.e., collide), the systems and methods may indicate a high probability of collision. Moreover, where the positions are in close proximity, the approach may indicate a mid-range likelihood of a collision, whereas positions beyond the defined proximity may indicate a low likelihood. Moreover, in further aspects, the disclosed system also determines blind spots associated with the various objects and/or cast by the subject vehicle itself, and can use the blind spots to further assess whether the objects are likely to collide.

Accordingly, the disclosed approach can then quantify the likelihood of a collision hazard by computing a collision probability according to the available information. If the collision probability satisfies a collision threshold, the alerts may be provided to the surrounding objects to facilitate avoiding collisions. For example, the systems and methods may cause the subject vehicle to activate (e.g., flash in a defined pattern) lights to communicate the collision hazard to one or more of the surrounding objects. That is, in order to provide a robust alert that does not necessitate specific hardware or protocols being implemented by other vehicles, the subject vehicle may use existing systems that are not reliant on the other vehicles such as flashing hazard lights, brake lights, turn signal lights, and so on. Moreover, the subject vehicle may specifically determine which lights to activate according to positions of relevant ones of the objects that are to receive the alert (e.g., ahead, behind, etc.). In this way, the disclosed approach functions to improve the safety of the subject vehicle and the surrounding objects by assisting the surrounding objects in avoiding collision hazards.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, can operate to identify aspects of the surrounding environment and communicate alerts and thus benefits from the functionality discussed herein.

The vehicle 100 also includes various elements. It will be understood that in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 (also referred to as the subject vehicle or ego vehicle herein) includes a collision warning system 170 that functions to improve the safety of the vehicle 100 and/or surrounding objects that receive communications induced by the collision warning system 170. Moreover, while depicted as a standalone component, in one or more embodiments, the collision warning system 170 is integrated with the autonomous driving system 160 (e.g., when present), or another component of the vehicle 100. The noted functions and methods will become more apparent with a further discussion of the figures.

Figure 2:
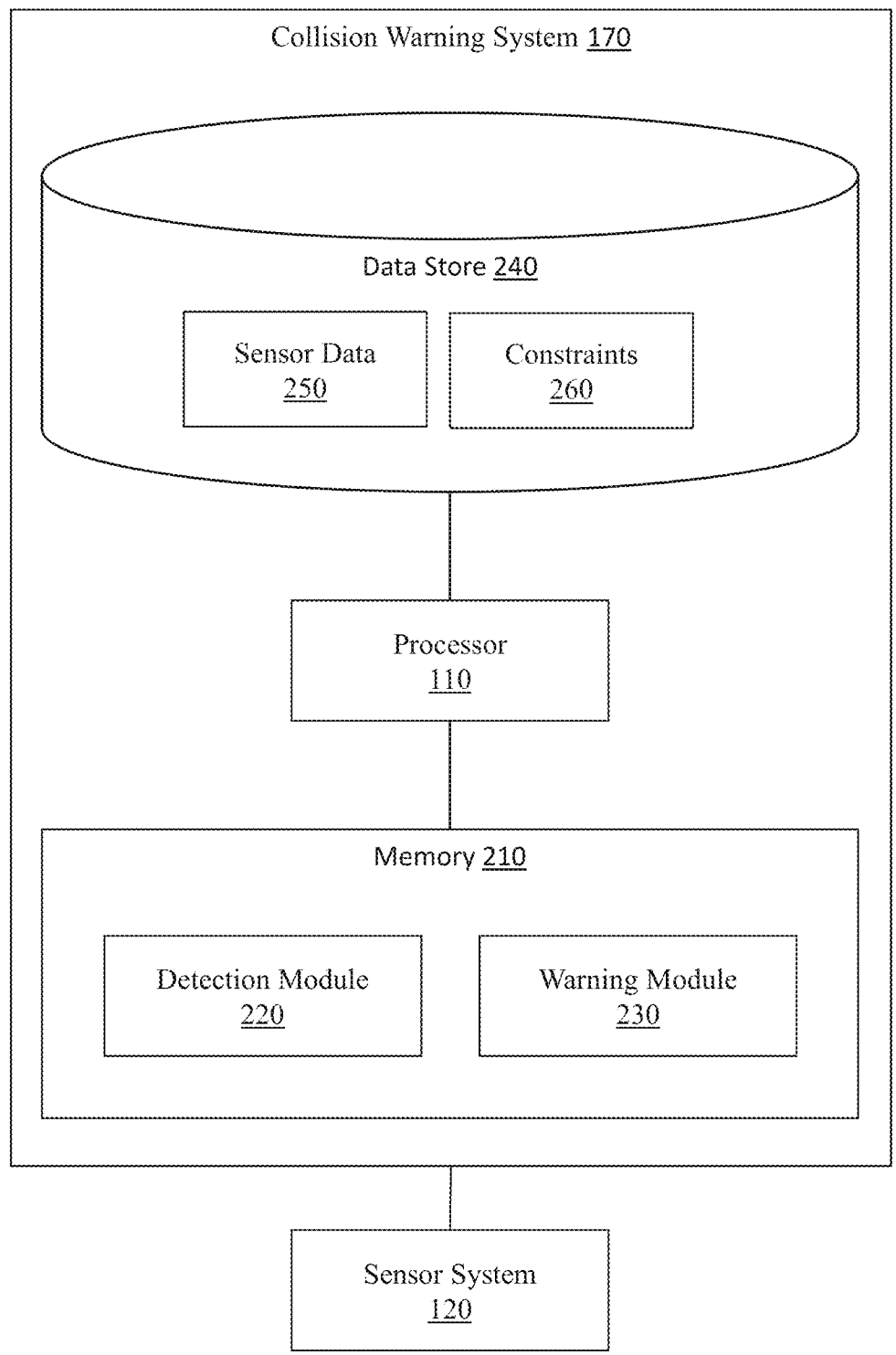
FIG. 2 illustrates one embodiment of a collision warning system that is associated with providing warnings to surrounding objects about collision hazards.

With reference to FIG. 2, one embodiment of the collision warning system 170 is further illustrated. As shown, the collision warning system 170 includes a processor 110. Accordingly, the processor 110 may be a part of the collision warning system 170 or the collision warning system 170 may access the processor 110 through a data bus or another communication pathway. In one or more embodiments, the processor 110 is an application-specific integrated circuit that is configured to implement functions associated with a detection module 220 and a warning module 230. More generally, in one or more aspects, the processor 110 is an electronic processor such as a microprocessor that is capable of performing various functions as described herein when loading the noted modules and executing encoding functions associated therewith.

In one embodiment, the collision warning system 170 includes a memory 210 that stores the detection module 220 and the warning module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware such as processing components (e.g., controllers), circuits, etc. for independently performing one or more of the noted functions.

Furthermore, in one embodiment, the collision warning system 170 includes a data store 240. The data store 240 is, in one embodiment, an electronically-based data structure for storing information. For example, in one approach, the data store 240 is a database that is stored in the memory 210 or another suitable medium, and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes sensor data 250, and constraints 260 (e.g., thresholds, defined patterns for activating lights, blind spot models, timing selections, etc.) along with, for example, other information that is used by the modules 220 and 230.

Accordingly, the detection module 220 generally includes instructions that function to control the processor 110 to acquire data inputs from one or more sensors (e.g., the sensor system 120) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or other area within which the vehicle 100 is traveling.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, velocities of surrounding objects/vehicles, and so on. Moreover, the detection module 220, in one embodiment, controls the sensors to acquire the sensor data 250 about an area that encompasses 360 degrees about the vehicle 100 in order to provide a comprehensive assessment of the surrounding environment. Accordingly, the sensor data 250 may include varying forms of observations about the surrounding environment that the detection module 220 derives from a single type of sensor (e.g., a radar sensor) or that the detection module 220 derives from fusing sensor data from multiple sources (e.g., mono-camera, stereo camera, LiDAR, radar, ultrasonic, etc.). In any case, the sensor data 250 provides observations of the surrounding environment to support the detection, identification, and localization of the surrounding objects.

Thus, as the vehicle 100 progresses along a path, the detection module 220 processes the sensor data 250 to detect the surrounding objects. As previously noted, the surrounding objects can include various types of objects such as vehicular (e.g., automobiles, trucks, motorcycles, etc.), non-vehicular (e.g., pedestrians, animals, bicycles, etc.), and even inanimate objects (e.g., road debris, potholes, etc.). Whichever objects makeup the detected surrounding objects, the collision warning system 170 generally functions to determine the potential for a collision and provide the alerts when at least one of the surrounding objects is a vehicular or non-vehicular object.

Moreover, while the present disclosure generally describes the collision warning system 170 within the context of detecting two surrounding vehicles, and providing the alerts in relation to the two surrounding vehicles, it should be appreciated that the collision warning system 170 may detect and provide alerts for any number of vehicles and/or other objects in a surrounding environment. For example, in various examples, the collision warning system 170 may detect two, three, four, or more objects including vehicles and other types of objects.

In any case, the detection module 220, as noted, generally functions to detect the surrounding objects and determine characteristics of the objects from the sensor data 250. The characteristics generally include at least a current position relative to the vehicle 100, and a velocity (i.e., speed and direction). In additional aspects, the detection module 220 may further determine more complex trajectories that are, for example, extrapolated from multiple prior observations (e.g., over two or more prior time steps). In any case, the detection module 220 generally uses the position and velocity information about the separate surrounding objects to predict future positions of the objects from which the module 220 can generate a determination about the likelihood of collision between the objects, as will be discussed in greater detail subsequently.

In yet further aspects, the detection module 220 may determine a particular type of the object, such as a vehicle, non-vehicular object, and inanimate object/obstacle. In one or more embodiments, the detection module 220 provides the particular type with a further granularity to specify the type as a specific class within the separate noted categories. For example, the detection module 220 may specify the object is an automobile, a semi-truck, a motorcycle, or another class of vehicle. Similarly, the detection module 220 may also indicate the type of the object with a finer-granularity of identification in relation to non-vehicular (e.g., pedestrian, animal, bicycle, etc.) and inanimate objects (e.g., road debris, pothole, etc.). To achieve the classification of type/class, the detection module 220 may implement one or more machine learning algorithms (e.g., convolutional neural networks) that process the sensor data 250 (e.g., images) and generate the classifications. In further aspects still, the detection module 220 may determine actual dimensions of the objects and define the objects according to the dimensions and type (e.g., truck pulling a 5 m long trailer).

Moreover, the type classification itself, in at least one embodiment, may further facilitate the detection module 220 predicting future positions, determining blind spots, and so on. That is, for example, the detection module 220 may predict movements of the object according to a particular type/class. By way of example, the detection module 220 may apply intuition according to the type, including maintaining particular lane assignments (e.g., bike lanes for bicycles, etc.), predicting speeds, or potential speed categories (e.g., average speeds of pedestrians), and so on.

The detection module 220 determines the presence of a blind spot, in one embodiment, according to the type of the object. For example, the collision warning system 170 may store models of the blind spots according to types of objects in the data store 240. That is, the models may define general shapes for areas around the object that are not perceivable. In one approach, the models are average areas for blind spots according to the type of the object. In further aspects, the detection module 220 can adapt the models according to observed attributes of the object such as a particular type of vehicle (e.g., truck vs. sedan), whether the vehicle is towing a trailer, and other influencing attributes. In yet a further approach, the detection module 220 may perform a ray-tracing analysis to determine perceivable areas in relation to a view of a driver. This approach may especially be undertaken in relation to other objects occluding a view of a driver, such as, for example, when an intervening vehicle obstructs a view of one of the surrounding vehicles/objects.

Accordingly, the detection module 220 can use the defined blind spots and the estimates of future positions of the objects to further determine the collision probability. In one aspect, the detection module 220 determines a blind spot component of the collision probability according to identifying whether the objects will be present in the blind spot(s) at any point through a prediction horizon. Thus, the detection module 220 determines, for example, the predicted future positions of the objects and, as part of this analysis, further determines whether a path to the future positions passes through or results in the objects encountering the blind spot(s). If the detection module 220 determines that the objects will encounter the blind spot(s), then the detection module 220 indicates this circumstance using the blind spot component. The blind spot component functions to influence the overall collision probability, since the presence of an object within a blind spot directly corresponds to whether, for example, one of the vehicles is aware of an object in its blind spot.

With continued reference to FIG. 2, in one embodiment, the warning module 230 generally includes instructions that function to control the processor 110 to determine whether the collision probability satisfies a collision threshold. The collision probability is an indicator specifying a likelihood that a collision will occur between the surrounding objects. As specified previously, the collision probability is, in one embodiment, comprised of two separate components, a collision component, and a blind spot component. The detection module 220 can combine the separate components into the collision probability according to a defined function that generally maps the combined aspects to an overall probability. In various implementations or where the blind spot component is otherwise not provided, the detection module 220 may use the collision component alone to define the collision probability. Thus, the collision probability may be comprised of different components depending on aspects of a given implementation and/or according to circumstances about the movement of the objects (e.g., presence in blind spots).

In any case, the constraints 260, in one or more implementations, define the collision threshold, which the warning module 230 applies to determine when to provide an alert. The collision threshold is, for example, a limit for the collision probability that when satisfied, indicates a collision is sufficiently likely such that the warning module 230 is to warn the surrounding objects. In various approaches, the warning module 230 may adapt when the alerts are generated according to, for example, one or more further aspects defined by the constraints 260 such as operating conditions (e.g., time of day, weather, etc.), a distance between the subject vehicle 100 and the surrounding object to which the alert is to be directed, and so on. For example, the collision warning system 170 may determine that the collision probability satisfies the collision threshold (e.g., exceeds), but may forgo generating the alert when current visibility would render the alert unseen by a target object because of an inter-vehicle distance or other conditions. Various instances in which the visibility may cause the warning module 230 to forgo generating of the alert include night time, inclement weather, a distance of the subject vehicle 100 from the target surrounding object (e.g., distance of greater than 150 m), and so on. In this way, the warning module 230 can adapt communication of the alert according to the current conditions.

The warning module 230 communicates an alert in response to determining the collision probability satisfies the collision threshold, and, for example, any further aspects of the constraints 260. In one embodiment, the warning module 230 communicates the alert by using exterior lights of the vehicle 100. That is, the warning module 230 can actuate various conspicuity lamps on the vehicle 100 to communicate the alert to the surrounding objects as opposed to conveying the alert through some electronic means that relies on, for example, corresponding electronic systems associated with the surrounding objects. Of course, in further implementations, the warning module 230 may additionally or alternatively leverage electronic systems to communicate the alert, such as vehicle-to-vehicle (V2V)

systems, vehicle-to-infrastructure (V2I), etc. However, it should be appreciated that the warning module 230 generally communicates the alert using the lamps of the vehicle 100 in order to avoid potential limitations of the surrounding objects.

The manner in which the warning module 230 actuates the lamps includes, in one embodiment, flashing hazard lights of the vehicle 100. Thus, the warning module 230 communicates the alert by flashing hazard lights of the vehicle 100 in order to indicate to the objects that a collision hazard is imminent. In further aspects, the warning module 230 may selectively activate one or more of the lamps of the vehicle 100. The warning module 230 may selectively activate the lamps according to various circumstances such as a location of the one or more surrounding objects to which the alert is being communicated, and according to a particular defined pattern specified by the constraints 260. Thus, the warning module 230 can identify a location of, for example, an object that is at risk of colliding with another object and has limited or no situational awareness of the potential collision, and then activate one or more lamps that are visible to the particular object (e.g., forward or rear hazard lights). In the instance of the warning module 230 activating the lamps according to a defined pattern, the warning module 230 may activate a single lamp (e.g., rear middle brake light) according to a unique pattern that is not associated with standard operation (e.g., eradicate or quick flashing pattern). In a further aspect, the warning module 230 may activate various ones of the lamps in series (e.g., three rear brake lights) to indicate the alert. As a general approach to communicating the alert, the warning module 230 generates the alert such that activation of the one or more lamps is distinctive in relation to the standard operation of the vehicle 100 so that another driver, pedestrian, bicyclist, etc. can easily distinguish the alert from common use of the lamps.

Moreover, the warning module 230 can generally activate any lamps/lights of the vehicle 100, including exterior and interior (where perceivable by other vehicles/objects) in order to communicate the alert. Thus, while the warning module 230, in one approach, is discussed as flashing hazard lights to communicate the alert, the warning module 230 may selectively activate any of the lamps of the vehicle 100 in order to provide the alert. As such, the warning module 230 may activate brake lights, turn signals, reverse lights, running lights, headlights, side mirror lights, parking lights, and any other lights that may be present on the vehicle 100, including standard equipment lights for traffic purposes and after-market lights. In this way, the collision warning system 170 improves the awareness of the surrounding vehicles to avoid collisions thereby improving overall safety in an area around the vehicle 100.

Figure 3:
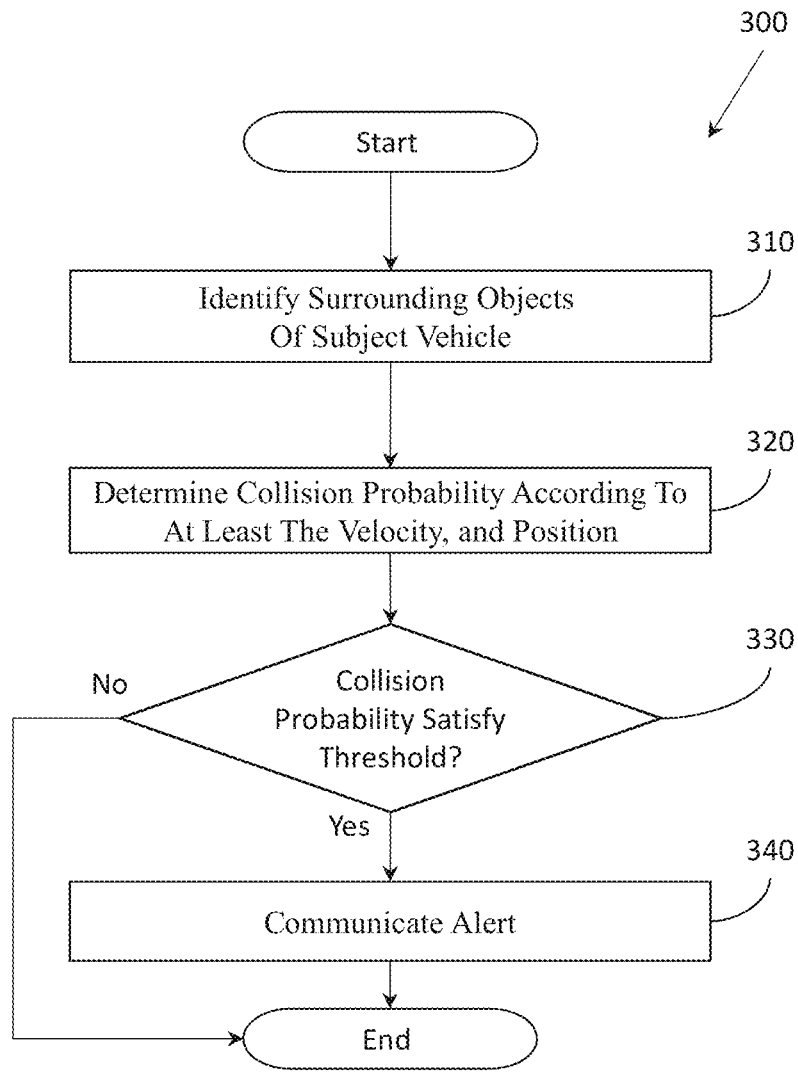
FIG. 3 illustrates one embodiment of a method associated with identifying collision hazards and communicating warnings about the collision hazards.

Additional aspects of providing warnings about collisions hazards to surrounding vehicles/objects will be discussed in relation to FIG. 3. FIG. 3 illustrates a method 300 associated with identifying collision hazards and communicating warnings about the collision hazards. Method 300 will be discussed from the perspective of the collision warning system 170 of FIG. 1. While method 300 is discussed in combination with the collision warning system 170, it should be appreciated that the method 300 is not limited to being implemented within the collision warning system 170 but is instead one example of a system that may implement the method 300.

At 310, the detection module 220 identifies surrounding objects of the subject vehicle 100 according to the sensor data 250. As previously noted, the detection module 220, in one or more implementations, iteratively acquires the sensor data 250 from one or more sensors of the sensor system 120. The sensor data 250 includes observations of a surrounding environment of the subject vehicle 100. Thus, the detection module 220 analyzes the sensor data 250 using one or more detection/identification routines that generally function to detect the presence of objects, classify/identify a type of the objects (e.g., vehicle, pedestrian, etc.), and localize the objects relative to the subject vehicle 100. Moreover, the detection module 220 may further derive additional information beyond the type and position of the surrounding objects, such as velocity information and other attributes that facilitate characterizing the objects and associated movements. In one or more implementations, the detection module 220 implements machine learning algorithms such as convolutional neural networks to identify/detect objects from the sensor data 250. Moreover, the detection module 220 may implement further routines to perform the localization such as simultaneous localization and mapping (SLAM) routines. In any case, the detection module 220 uses the sensor data to acquire awareness about the surrounding environment including aspects relating to the surrounding objects.

At 320, the detection module 220 uses the previously derived information from the sensor data 250 to determine a collision probability for at least two of the objects. As an initial note, while the detection module 220 is discussed in relation to determining a collision probability for two separate objects, the detection module 220 may undertake the same analysis for more than two objects surrounding the vehicle 100. For example, the detection module 220 may determine collision probabilities in a pair-wise fashion for all surrounding objects. In yet a further implementation, the detection module 220 may combine the pair-wise determinations to identify object-specific collision probabilities for circumstances involving multiple different objects.

In any case, as previously noted, the collision probability indicates a likelihood of collision between at least two surrounding objects (e.g., a first object and a second object). In one embodiment, the detection module 220 determines the collision probability by estimating future positions for objects and predicting whether the objects will collide according to a proximity between the future positions. For example, the detection module 220 uses the information about the surrounding objects, such as a current position, and a velocity to estimate a first position of a first object and a second position of a second object at time $T=t+\Delta t$ in the future. The detection module 220 can then compare the first position and the second position to determine a proximity of the first and second objects. From this proximity, the detection module 220 can define the collision probability.

Figure 4A:
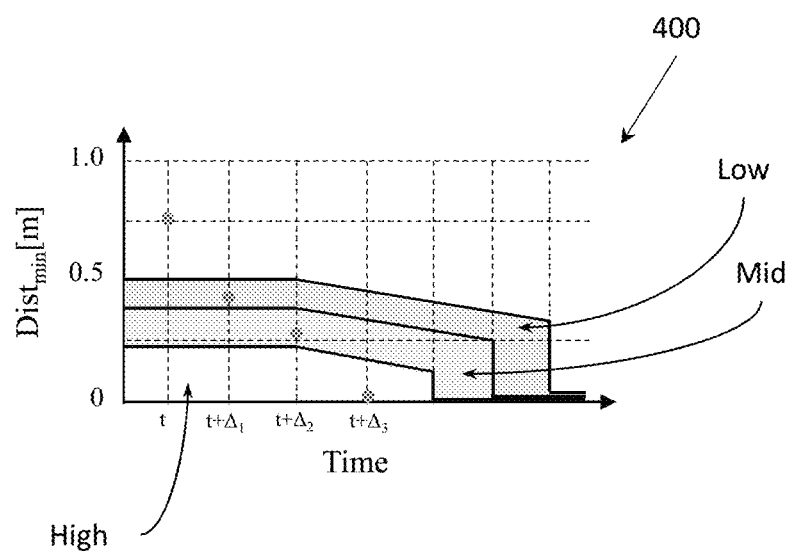
FIG. 4A illustrates a graph of proximities and associations with collision probabilities.
Figure 4B:
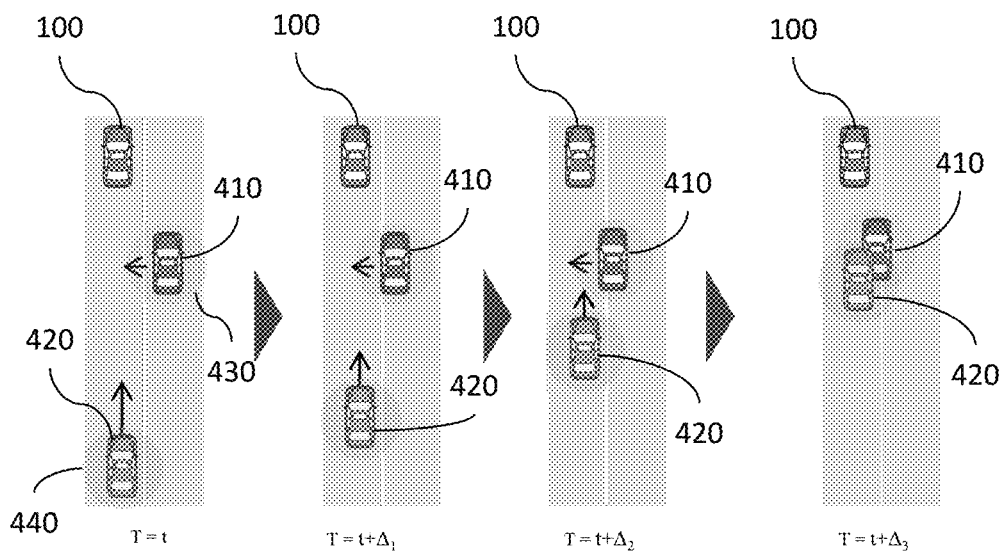
FIG. 4B illustrates a diagram of surrounding vehicles at separate predicted instances in time.

By way of example, consider FIGS. 4A and 4B, which illustrate a graph 400 of the proximity (e.g., $Dist_{min}$) versus time, and diagrams of positions of the vehicle 100 and surrounding vehicles 410 and 420 at separate time steps. FIG. 4B represents the vehicles 410 and 420 at a current time t, and at three successive time steps, which are generally spaced at equal intervals in time out to a prediction horizon. As shown in FIG. 4B, vehicles 410 and 420 are represented by simple circles 430 and 440, respectively. That is, the detection module 220, in one approach, reduces the surrounding objects to simple shapes (e.g., circles or rectangles) in order to simplify determinations about proximities. Of course, in further aspects, the detection module 220 may determine an actual shape of the objects and use the actual shape for the analysis.

In any case, the detection module 220 estimates the positions of the vehicles 410 and 420 out to a prediction horizon. In one approach, the prediction horizon is a single time step into the future (e.g., $T=t+\Delta_1$). In further aspects, the detection module 220 estimates the positions at multiple time steps into the future (e.g., $t+\Delta_1$, $t+\Delta_2$, $t+\Delta_3$). Thus, depending on the particular implementation, the detection module 220 may determine the collision probability from the single estimate at the time step $t+\Delta_1$, or according to the multiple separate time steps. In general, the detection module 220 is comparing the predicted future positions to determine the proximity between the vehicles 410 and 420 at the separate time steps. The detection module 220 determines the proximities according to a closest point on each of the vehicles 410 and 420. Thus, where the detection module 220 uses the simplified shape, the proximity between the two vehicles is defined according to a closest point on the outer edge of the shape (e.g., on a circumference of a circle).

In one embodiment, as shown in FIG. 4A, the detection module 220 uses the proximity according to a defined set of zones to determine the collision probability. For example, as shown in FIG. 4A, when a single time step is estimated, the detection module 220 may define the collision component of the collision probability according to a corresponding zone for the proximity. By way of example, if the detection module 220 estimates the position at a single time step into the future, e.g., $t+\Delta_1$, then the collision probability is defined according to a low probability of collision, as shown on the graph 400. Thus, the detection module 220 may define the collision probability according to a category or by assigning a particular percentage value (e.g., 30%).

In an implementation where the detection module 220 defines the collision probability according to multiple separate time steps, the detection module 220 may separately weigh each proximity from the separate time steps since, for example, the further estimates into the future may be associated with a greater degree of error. Accordingly, in such an example, the detection module 220 may combine the separate probability zones associated with the separate predictions according to a weighted average (e.g., $(w_1(t+\Delta_1)+w_2(t+\Delta_2)+w_3(t+\Delta_3))/n$) In still further examples, the detection module 220 increments the collision probability according to separate factors such as predicted proximities falling in a low level, a mid level, a high level, a velocity of the objects, use of blinkers, presence in blind spots, and other factors influencing the potential for collision.

Thus, in such an approach, the detection module 220 may increment the collision probability according to separately defined values for the different aspects (e.g., 5%, 10%, 20%, etc.). In any case, FIG. 4A illustrates separate proximity zones associated with separate collision probabilities that the detection module 220 uses to assess the interactions of the surrounding objects. Additionally, it should be appreciated that the separate zones such as the high probability zone generally correspond to a predicted overlap, or at least very close correlation, in positions that would be associated with a crash, the mid-tier zone corresponds with the objects passing closely (e.g., within a dangerous operating distance), and so on. As one example of a distance calculation that correlates with FIG. 4A, the $\text{Dist}_{min}=\text{Dist}_{c2c}-(r_1+r_2)$, where $\text{Dist}_{c2c}$ is a distance between geometric centers of the respective objects, and $r_1$, $r_2$ are respective radii of circles representing the first and second objects. The detection module 220 may further normalize the Distrain calculation according to a prediction horizon/distance within which the determinations are generated (e.g., 100 m). Thus, the graph 400 may represent the proximities from 0 to 1 as opposed to using actual distance values.

At 330, the warning module 230 determines whether the collision probability satisfies a collision threshold. The collision system 170, in one embodiment, defines the collision threshold according to a likelihood of the objects encountering a collision hazard (e.g., colliding) with the collision probability indicating a threshold or limit that is tolerable prior to issuing an alert. Thus, the collision warning system 170 may define the collision threshold according to a category (e.g., high) or as a percent (e.g., 80%). The particular value that the system 170 uses to define the threshold may be adapted according to various conditions such as weather, according to the types of the objects (e.g., pedestrians), according to speeds at which the objects are traveling, according to attributes of the roadway (e.g., school zone, no passing zone, etc.), or according to other aspects of operation that may influence the communication of the alert. As a general tenet, the system 170 sets the threshold collision threshold such that the warning module 230 communicates the alert when a collision hazard is deemed "likely," and subsequently may adapt the threshold according to the noted factors (e.g., when safer operation is desired because of weather, school zones, etc.).

Thus, the warning module 230 acquires the collision probability as determined by the detection module 220 and compares the collision probability with the collision threshold. If the collision probability satisfies the threshold, then the warning module 230 communicates the alert, as discussed at 340. If the collision probability does not satisfy the threshold, the detection module 220 continues with assessing a subsequent time step beginning at 310.

At 340, the warning module 230 communicates an alert to at least one of the surrounding objects about the collision hazard associated with the surrounding objects colliding. In one embodiment, the warning module 230 activates lights of the subject vehicle 100 to visibly communicate the alert to the at least one of the surrounding objects. In various implementations, the manner in which the warning module 230 activates the lights may vary according to different circumstances such as a current visibility of the surrounding objects in relation to the lights of the vehicle 100. That is, depending on a distance, a time of day, current weather conditions, and so on, the warning module 230 may not activate the lights or activate the lights in a manner that is more visible and likely to be perceived according to the current visibility of the surrounding environment. As one example, instead of activating hazard lights on a rear section of the vehicle 100, the warning module 230 may activate all available lights such as brake lights, hazard/turn signal lights, backup lights, and so on in order to increase the visibility of the alert when conditions warrant.

Figure 5:
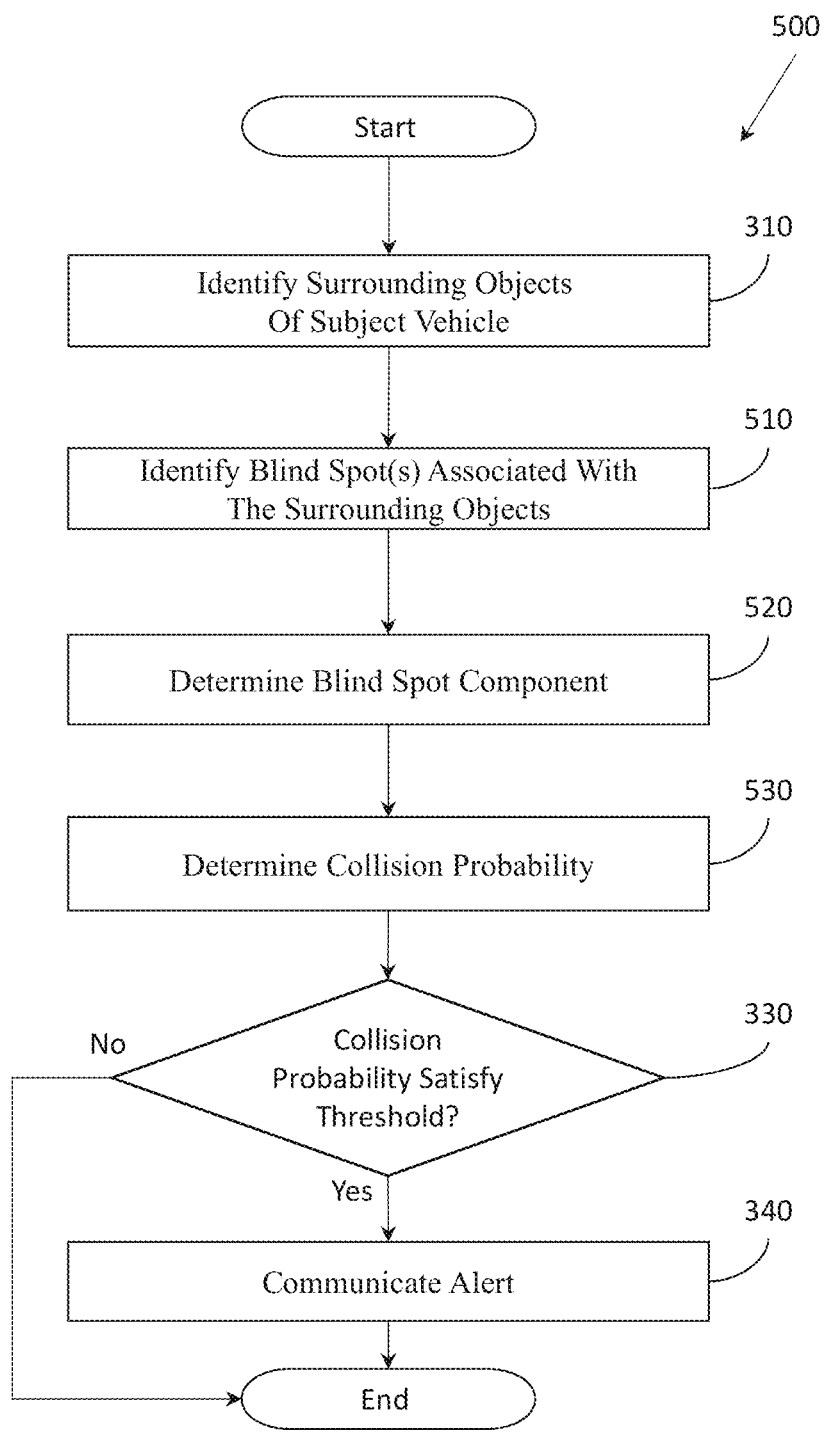
FIG. 5 illustrates one embodiment of a method associated with communicating alerts about collision hazards that further includes assessing blind spots.

Further aspects of identifying and communicating alerts about collision hazards will be discussed in relation to FIG. 5. FIG. 5 illustrates a method 500 associated with identifying collision hazards and communicating warnings about the collision hazards. In a similar fashion as with the discussion of method 300, method 500 will be discussed from the perspective of the collision warning system 170 of FIG. 1. While method 500 is discussed in combination with the collision warning system 170, it should be appreciated that the method 500 is not limited to being implemented within the collision warning system 170, but is instead one example of a system that may implement the method 500. Moreover, method 500 is illustrated as including several aspects from method 300 (e.g., 310-320, 340). Thus, the corresponding aspects will not be fully described again in order to avoid duplicate discussions.

At 310, the detection module 220 identifies surrounding objects of the subject vehicle 100 according to the sensor data 250. As previously noted, the detection module 220 may implement various routines in order to analyze the sensor data 250 and develop a situational awareness about the surrounding environment, including the presence and location of the surrounding objects.

At 510, the detection module 220 determines blind spots associated with the surrounding objects. In one embodiment, the detection module 220 determines the blind spots to further assess the potential for a collision between the objects. Thus, the detection module 220, in one approach, defines areas that are not perceived by one or more of the surrounding objects as the blind spots. In one embodiment, the detection module 220 models the blind spots according to known areas that are not perceivable for different types of objects. For example, in one approach, the collision warning system 170 defines a set of models, which may be provided as part of the constraints 260. The set of models include shapes of blind spots (e.g., general geometric forms and dimensions) for separate types of objects such as pedestrians, motorcycles, automobiles, semi-trucks, and so on.

Figure 6A:
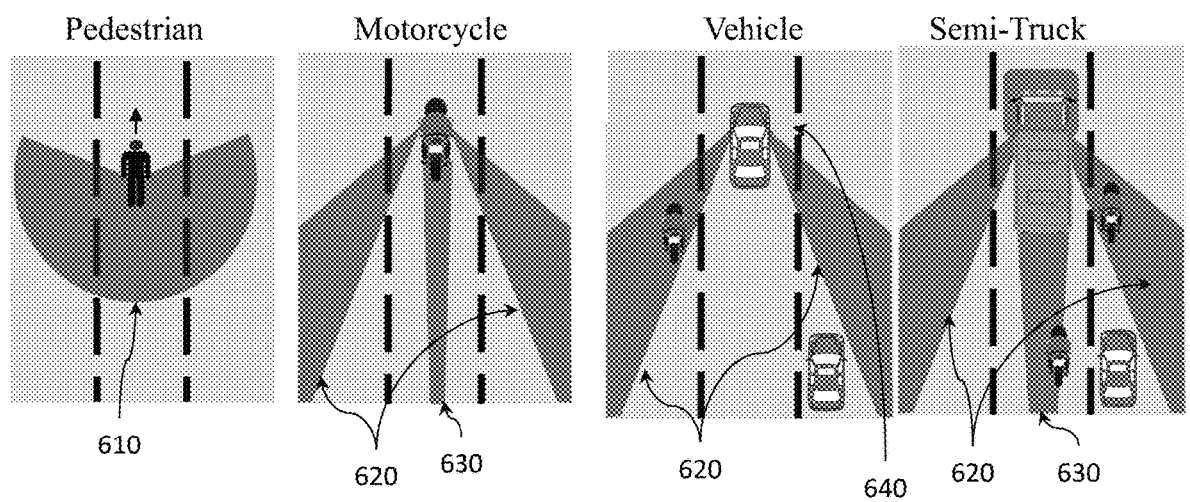
FIG. 6A illustrates multiple diagrams of separate types of blind spots.
Figure 6B:
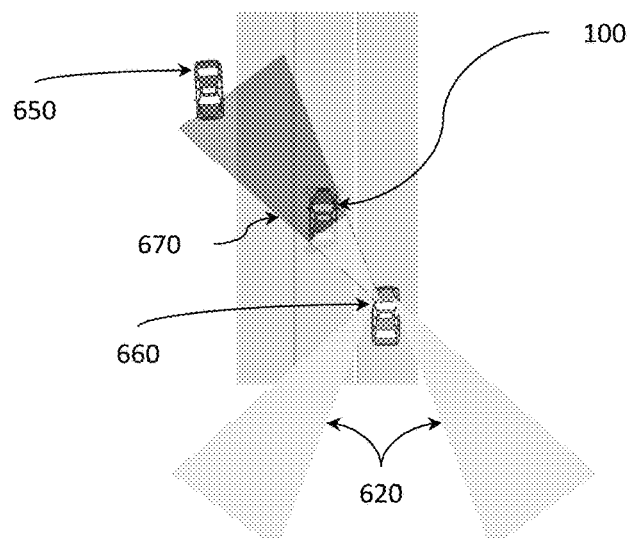
FIG. 6B illustrates an additional example of a blind spot from an occlusion.
Figure 7:
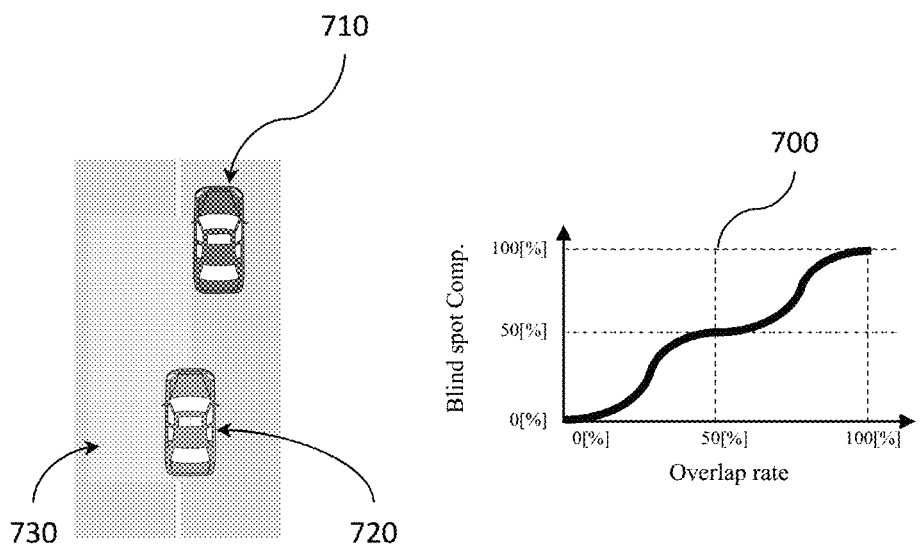
FIG. 7 illustrates separate examples of a blind spot component of a collision probability.

By way of example, consider FIG. 6A, which illustrates four separate objects and associated blind spots. As seen in FIG. 6A, the shapes of the blind spots vary according to the different types of objects. The blind spot 610 is particular to a pedestrian and a direction in which the pedestrian is walking. The set of models may include various assumptions, such as in the case of a pedestrian where the focus of a field of view for the pedestrian is assumed to be a direction of travel, which thereby defines the general area of the blind spot in relation to the pedestrian. Additionally, different objects may have different configurations of blind spots, such as with the motorcycle and semi-truck that have both side blind spots 620 and rear blind spots 630. Moreover, the blind spot model for the vehicle may include two different types of side blind spots 620 and 640. Blind spots 640 (not explicitly illustrated) are generally associated with potential blind spots that are conditional on whether the driver is presently scanning forward of the vehicle or to the side of the vehicle. Similarly, the models may include areas around a cabin/passenger compartment of larger vehicles that are not visible (e.g., 0-2 m in front of semi-truck).

Additionally, in various approaches, the set of models may include a plurality of different models that are specific to different makes/models of vehicles and other specific objects; however, in a further approach, the set of models may include templates for general classes of objects. Thus, in this particular instance, the detection module 220 may adapt a model according to attributes of the object (e.g., size, additional features, etc.) in order to generate the blind spots. In still further aspects, the detection module 220 further considers additional modifications of vehicles when generating blind spots such as the presence of a trailer that the vehicle is towing, the presence of a bike rack, and other modifications that may influence the visibility of a driver.

As a further aspect of determining the blind spots, the detection module 220, in at least one approach, may further consider occlusions within the surrounding environment that influence the visibility of a particular object. Thus, as one example, consider FIG. 6B, which illustrates the subject vehicle 100 and two surrounding vehicles 650 and 660. The vehicle 650 is heading toward the vehicles 100 and 660. As shown, the subject vehicle 100 occludes a view of the vehicle 650 by vehicle 660, and vice versa (not illustrated). Thus, the vehicle 100 causes blind spot 670 in relation to the vehicle 660, which also has blind spots 620. Similarly, other objects (e.g., trees, signs, buildings, etc.) in the surrounding environment may cause occlusions that the detection module 220 can identify and consider through generation of the blind spot component, as explained further subsequently. In this way, the collision warning system 170 can improve identification of potential collision hazards.

At 520, the detection module 220 defines a blind spot component of the collision probability. In one embodiment, the detection module 220 uses the blind spots defined at 510 to assess the surrounding objects in relation to the blind spots. That is, the detection module 220 determines whether or not the surrounding objects pass through the blind spots. The general intuition associated with assessing the blind spots is that a lack of awareness on the part of any one of the surrounding objects about the position of another object is generally a hazardous situation especially when the objects are moving within a reasonably close proximity. Thus, for instances in which the vehicles move through the blind spots or travel in the blind spots, the probability of a collision generally increases.

Thus, as discussed previously in relation to determining future positions, the detection module 220 uses position information, velocities, blind spot information, and other associated information to determine whether the objects will pass through the blind spots or are currently traveling in a blind spot of another object. Accordingly, the detection module 220 predicts one or more future positions of the surrounding objects from which the detection module 220 identifies whether a path of the respective objects would pass through or travel within one or more of the blind spots. The detection module 230 may determine the blind spot component according to a discrete assessment of whether a given object passes through a blind spot (i.e., yes or no) from which the detection module 220 assigns a value to the blind spot component. In further aspects, the detection module 220 may undertake a more complex assessment such as how many times an object passes through one or more blind spots, whether both objects pass through one or more blind spots, whether both objects are in blind spots at the same time, and so on. From this assessment, the detection module 220 can assign increasing values for the blind spot component to account for increased chances of a collision hazard.

In yet a further approach, the detection module 220 considers an extent of overlap within a blind spot and may also consider a duration of time in a blind spot. For example, the detection module 220, in one embodiment, determines the blind spot component by identifying an extent to which an object is overlapping with the blind spot. Consider FIG. 7, which illustrates one example of a graph 700 showing a correlation between the blind spot component and an extent of overlap with a blind spot by an object. As shown, a vehicle 710 is traveling in front of a vehicle 720, and the vehicle 710 has a blind spot 730. The vehicle 720 overlaps the blind spot 730 by approximately 50%. Thus, the detection module 220 uses the correlation indicated in the graph 700 to define the blind spot component according to the extent of overlap. In further embodiments, the detection module 220 may consider overlap for both the vehicle 710 and the vehicle 720 to generate the blind spot component. That is, the blind spot component is assessed together for both vehicles. Moreover, in yet a further aspect, the detection module 220 further assesses an amount of time spent in the blind spot by each object and further adapts the blind spot component accordingly (e.g., increases or decreases in relation to a mean time spent and an extent of overlap). In any case, the detection module 220 improves the determination of the collision probability by further assessing the blind spots in relation to the separate surrounding objects. From this assessment, the detection module 220 defines the blind spot component of the collision probability.

At 530, the detection module 230 generates the collision probability. In one embodiment, the detection module 220 generates the collision component as discussed in relation to block 320 of method 300 but further adapts the collision component to generate the overall collision probability according to the blind spot component from block 520. The detection module 220, in one approach, uses the blind spot component to modify the collision component and generate the overall collision probability. Thus, the detection module 220 generally adapts the collision component by, for example, increasing a probability according to a value of the blind spot component. Thus, as one example, when the blind spot component is 0% or has a categorical value of low, the detection module 220 may refrain from modifying the collision component. However, when the blind spot component is a value greater than 0% or is "mid," or "high," the detection module 220 generally increases the collision probability according to an extent specified by the constraints 260. Thus, in one approach, the detection module 220 increases the collision probability by a percentage equal to the blind spot component. In further approaches, the constraints may define a heuristic that the detection module 220 uses to adapt the collision probability as a function of the blind spot component.

At 330, the warning module 230 determines whether the collision probability satisfies a collision threshold. As previously noted, the collision system 170, in one embodiment, defines the collision threshold according to a likelihood of the objects encountering a collision hazard (e.g., colliding) with the collision probability indicating a threshold or limit that is tolerable prior to issuing an alert. Thus, the warning module 230 acquires the collision probability as determined by the detection module 220 including the blind spot component, and compares the collision probability with the collision threshold. If the collision probability satisfies the threshold, then the warning module 230 communicates the alert, as discussed at 340. If the collision probability does not satisfy the threshold, the detection module 220 continues with assessing a subsequent time step beginning at 310.

At 340, the warning module 230 communicates an alert to at least one of the surrounding objects about the collision hazard associated with the surrounding objects colliding. In one embodiment, the warning module 230 activates lights of the subject vehicle 100 to visibly communicate the alert to the at least one of the surrounding objects. As previously explained, in various implementations, the warning module 230 activates the lamps/lights of the vehicle 100 in different ways to communicate the alert. For example, in one aspect, the warning module 230 identifies which object/vehicle is unaware of the hazard (if not both), and determines a spatial relationship of the object in relation to the vehicle 100. The warning module 230 determines which lamps of the vehicle 100 are visible to the object and activates the associated lights to communicate the alert. By way of example, in one aspect, the warning module 230 selects between front and rear hazard lights (i.e., turn signals). Thus, when the object is forward of the vehicle 100, the warning module 230 activates the front hazard lights, and when the object is to the rear of the vehicle 100, the warning module 230 activates the rear hazard lights. It should be appreciated that while the hazard lamps are discussed for purposes of example, other lights that are visible may be selectively activated.

Figure 8A:
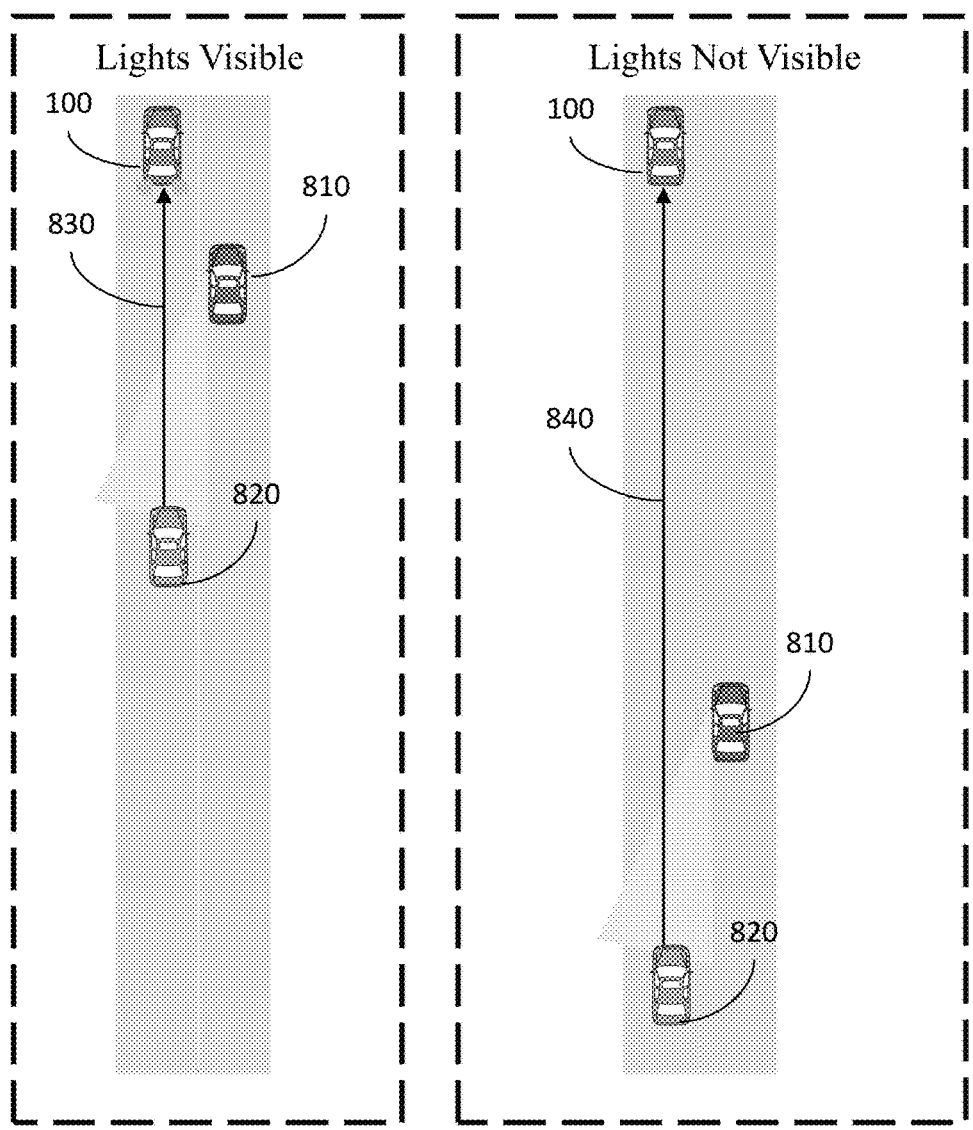
FIG. 8A illustrates a diagram of surrounding vehicles at different distances from a subject vehicle.

Additionally, the warning module 230, in one or more embodiments, may further adapt the alert according to a current visibility. As shown in FIG. 8A, two diagrams illustrate visible and not visible scenarios. In particular, FIG. 8A illustrates the vehicle 100 traveling ahead of vehicle 810 and vehicle 820. The collision warning system 170 determines that the collision probability satisfies the threshold for the illustrated scenario, and a distance 830 to the relevant vehicle 820 that is to be warned is within a visibility threshold for a current visibility such that the warning module 230 activates the rear hazard lights. In the not visible scenario, the distance 840 exceeds the visibility threshold. Thus, the warning module 230 does not activate the lights to communicate the alert. It should be appreciated that the warning module 230 may adjust the visibility threshold according to different attributes that influence visibility, such as weather, time of day, and so on. Moreover, in further embodiments, the warning module 230 may adapt the alert itself instead of forgoing communication of the alert. That is, the warning module 230 may adapt a brightness of lights, which lights are activated (e.g., activate additional lights), a defined pattern for activating the lights, and so on in order to further improve visibility.

Figure 8B:
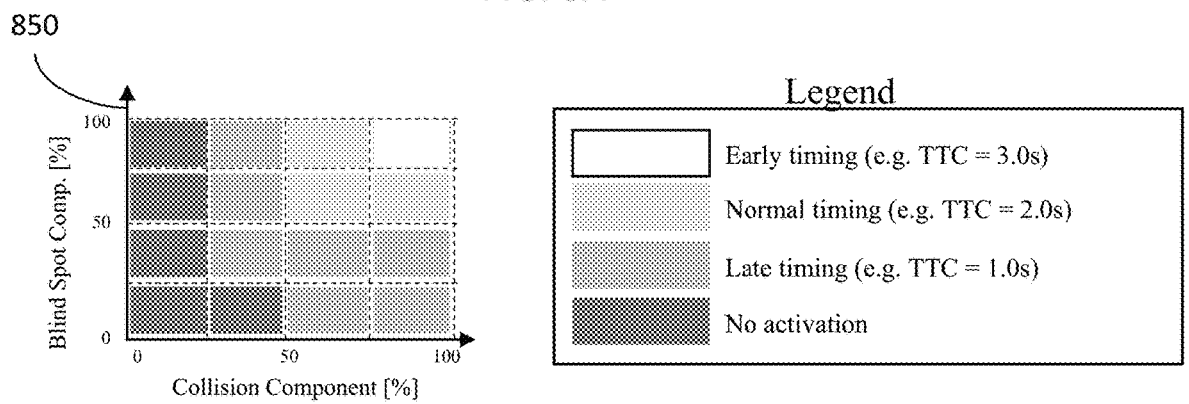
FIG. 8B is a graph illustrating selection of timing for communicating the alerts.

As a further aspect of communicating the alert, in one embodiment, the warning module 230 adapts the timing of when the alert is communicated according to the collision probability. For example, as shown in FIG. 8B, a graph 850 illustrates how the warning module 230 determines when to communicate the alert depending on components of the collision probability. In particular, in the illustrated example, the warning module 230 activates the lights according to a time to collision (TTC) and the collision probability. Thus, depending on the components of the collision probability (e.g., blind spot component and collision component), the warning module 230 may communicate the alert earlier.

In still further instances that are not illustrated, the warning module 230 may adapt when the alert is communicated according to detecting lane change indicators (i.e., turn signals) being activated on or more surrounding vehicles, detecting movement of a surrounding vehicle that corresponds with a lane change, or identifying other activities by the surrounding vehicles/objects that are indicative of changing positions into a situation that is more likely to encounter a collision.

Figure 9:
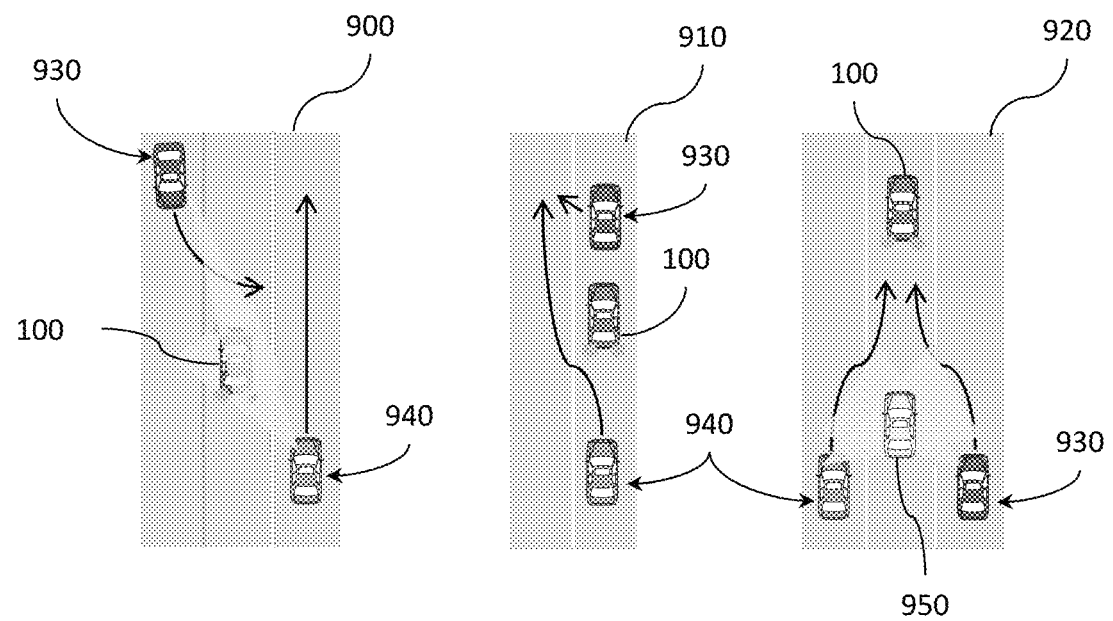
FIG. 9 illustrates multiple examples of collision hazards.
Figure 10:
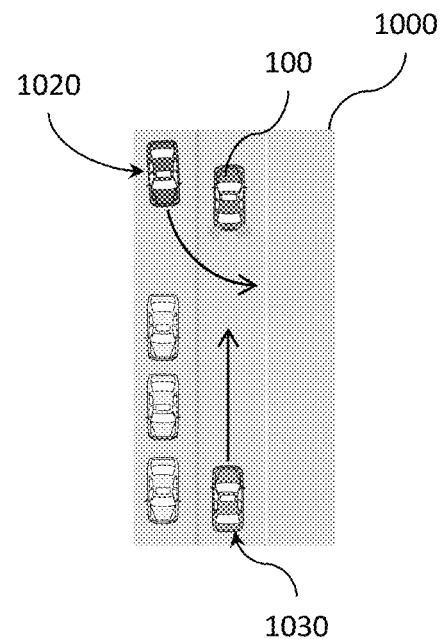
FIG. 10 illustrates multiple diagrams indicating different examples of communication alerts about collision hazards.
Figure 10:
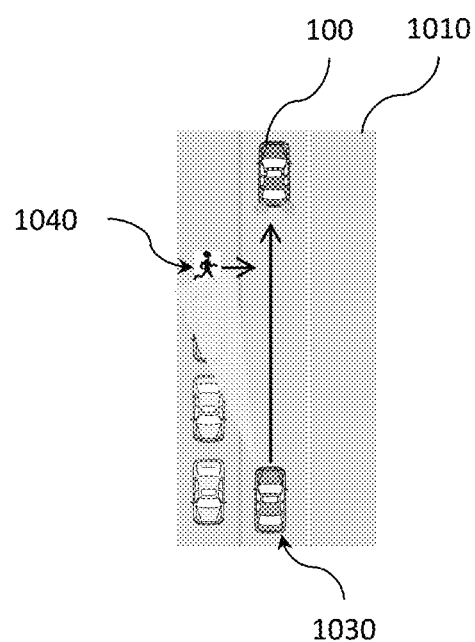

As a further explanation of how the presently disclosed systems and methods communicate alerts about collision hazards, consider FIGS. 9-10. FIG. 9 illustrates three separate examples 900, 910, and 920. As shown in example 900, two surrounding vehicles 930 and 940 are traveling near the subject vehicle 100. The vehicle 100 is occluding views of the vehicles 930 and 940 thereby generating separate blind spots. Moreover, a predicted future position of the vehicle 930 includes the vehicle 930 turning left across the lanes. Thus, the collision warning system 170 determines that a collision hazard exists due to the blind spots and the predicted positions. Thus, the collision warning system 170 communicates alerts using forward and rear hazard lights of the vehicle 100 in order to inform both the vehicle 930 and the vehicle 940.

As illustrated in example 910, the vehicle 940 is predicted to move around the subject vehicle 100 while the vehicle 930 is predicted to move into the adjacent lane at a position that is proximate to the future position of vehicle 940. Thus, the collision warning system 170 communicates an alert to vehicle 940 about the hazard of vehicle e930 changing lanes.

Moreover, while not explicitly illustrated in example 910, both vehicles are in blind spots caused by the vehicle 100 occluding views of the respective vehicles 930 and 940.

As illustrated in example 920, the collision warning system of the vehicle 100 observes the vehicles 930, 940, and 950 traveling behind the vehicle 100. The system 170 predicts movements that are proximate and that are further complicated by blind spots from the vehicle 950 occluding views. Thus, the system 170 communicates an alert using rear hazard lamps to inform the vehicles 930 and 940 about the collision hazard.

FIG. 10 illustrates two further examples 1000 and 1010 of how the collision warning system 170 may function. In example 1000, surrounding vehicles 1020 and 1030 are predicted to pass closely by one another. Thus, the system 170 activates rear hazard lamps to alert the vehicle 1030. However, as shown, the vehicle 100 cannot inform vehicle 1020 as no lights are generally visible to the vehicle 1020 since the vehicle 1020 is positioned alongside the vehicle 100.

As illustrated in example 1010, the vehicle 1030 is following behind the vehicle 100, and a pedestrian 1040 is moving into the roadway from an occluded position behind a row of cars. Thus, as positioned, the vehicle 1030 has no view of the pedestrian since the pedestrian 1040 is in a blind spot of the vehicle 1030. Thus, the system 170 communicates an alert to the vehicle 1030 about the collision hazard with the pedestrian 1040.

Additionally, it should be appreciated that the collision warning system 170 from FIG. 1 can be configured in various arrangements with separate integrated circuits and/or electronic chips. In such embodiments, the detection module 220 is embodied as a separate integrated circuit. Additionally, the warning module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the collision warning system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data 116 can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras 126 can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the collision warning system 170, and/or the autonomous driving system 160 can be operatively connected to communicate with the various vehicle systems 150 and/or individual components thereof. For example, returning to FIG. 1, the processor(s) 110 and/or the autonomous driving system 160 can be in communication to send and/or receive information from the various vehicle systems 150 to control the movement, speed, maneuvering, heading, direction, etc. of the vehicle 100. The processor(s) 110, the collision warning system 170, and/or the autonomous driving system 160 may control some or all of these vehicle systems 150 and, thus, may be partially or fully autonomous.

The processor(s) 110, the collision warning system 170, and/or the autonomous driving system 160 can be operatively connected to communicate with the various vehicle systems 150 and/or individual components thereof. For example, returning to FIG. 1, the processor(s) 110, the collision warning system 170, and/or the autonomous driving system 160 can be in communication to send and/or receive information from the various vehicle systems 150 to control the movement, speed, maneuvering, heading, direction, etc. of the vehicle 100. The processor(s) 110, the collision warning system 170, and/or the autonomous driving system 160 may control some or all of these vehicle systems 150.

The processor(s) 110, the collision warning system 170, and/or the autonomous driving system 160 may be operable to control the navigation and/or maneuvering of the vehicle 100 by controlling one or more of the vehicle systems 150 and/or components thereof. For instance, when operating in an autonomous mode, the processor(s) 110, the collision warning system 170, and/or the autonomous driving system 160 can control the direction and/or speed of the vehicle 100. The processor(s) 110, the collision warning system 170, and/or the autonomous driving system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the collision warning system 170 and/or the autonomous driving system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the autonomous driving system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, one or more data stores 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the collision warning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A warning system for providing a warning from a subject vehicle to surrounding objects about a collision hazard, comprising:
   one or more processors;
   a memory communicably coupled to the one or more processors and storing:
   a detection module including instructions that when executed by the one or more processors cause the one or more processors to identify the surrounding objects of the subject vehicle according to sensor data about a surrounding environment of the subject vehicle, and
   determine a collision probability indicating a likelihood of collision between a first object and a second object of the surrounding objects that are separate from the subject vehicle; and
   a warning module including instructions that when executed by the one or more processors cause the one or more processors to, in response to the collision probability satisfying a collision threshold, communicate, by the subject vehicle, an alert to at least one of the surrounding objects about the collision hazard associated with the surrounding objects colliding by activating lights of the subject vehicle to visibly communicate the alert to the at least one of the surrounding objects.

2. The warning system of claim 1,
   wherein the warning module includes instructions to communicate the alert including instructions to determine relative positions of the surrounding objects and selecting which of the lights of the subject vehicle to activate according to the positions when communicating the alert.

3. The warning system of claim 2, wherein the warning module includes instructions to activate the lights including instructions to flash the lights that include at least one of rear lights on the subject vehicle or front lights on the subject vehicle according to a defined pattern,
   wherein the warning module includes instructions to communicate the alert including instructions to determine a current visibility and to activate the lights of the subject vehicle according to whether the current visibility satisfies a visibility threshold, and
   wherein the warning module includes instructions to determine the current visibility including instructions to identify at least one of a distance of the surrounding objects to the subject vehicle and a time of day.

4. The warning system of claim 1, wherein the detection module includes instructions to determine the collision probability including instructions to i) estimate a first position of the first object and a second position of the second object at a future point in time as a function of at least current velocities and current positions of the first object and the second object, ii) determine a proximity of the first position and the second position, and iii) compute a collision component of the collision probability according to the proximity, and
   wherein the collision component indicates a likelihood of the first object and the second object colliding at the future point in time.

5. The warning system of claim 4, wherein the detection module includes instructions to defining the collision component including instructions to determine which of a set of proximity zones the proximity is within, wherein a first zone of the set is associated with the proximity indicating that the first position and the second position are overlapping within areas of the first object and the second object, and at least a second zone of the set is associated with the proximity satisfying a danger threshold indicating the first object and the second object are closely passing.

6. The warning system of claim 1, wherein the detection module includes instructions to determine the collision probability including instructions to:
   determine one or more blind spots associated with visible areas that are not perceived by one or more of the surrounding objects,
   determine whether the surrounding objects are within or are to pass through the one or more blind spots, and
   define a blind spot component of the collision probability according to whether the surrounding objects are to pass through the one or more blind spots.

7. The warning system of claim 6, wherein the detection module includes instructions to define the blind spot component including instructions for determining whether one of or both of the surrounding objects are to pass through the one or more blind spots, and
   wherein determining the one or more blind spots includes determining whether the subject vehicle causes a blind spot in relation to at least one of the surrounding objects.

8. The warning system of claim 6, wherein the detection module includes instructions to determine the one or more blind spots including instructions to identify types for the surrounding objects and define shapes of the one or more blind spots according to at least the types,
   wherein the types include at least pedestrian, motorcycle, automobile, and truck, and
   wherein the shapes are separately modeled according to the types to define perceivable areas of the surrounding objects, the one or more blind spots defining areas that at least one of the surrounding objects cannot perceive.

9. The warning system of claim 1, wherein the surrounding objects are vehicles, wherein the sensor data includes at least radar returns from a radar sensor of the subject vehicle, and wherein communicating the alert includes adapting when the alert is communicated according to at least one of: detecting one of the vehicles has activated lane change indicators, and detecting movement of at least one of the vehicles corresponding with a lane change.

10. A non-transitory computer-readable medium storing instructions for providing a warning from a subject vehicle to surrounding objects about a collision hazard and that when executed by one or more processors, cause the one or more processors to:
   identify surrounding objects of the subject vehicle according to sensor data about a surrounding environment of the subject vehicle, and
   determine a collision probability indicating a likelihood of collision between a first object and a second object of the surrounding objects that are separate from the subject vehicle; and in response to the collision probability satisfying a collision threshold, communicate, by the subject vehicle, an alert to at least one of the surrounding objects about the collision hazard associated with the surrounding objects colliding by activating lights of the subject vehicle to visibly communicate the alert to the at least one of the surrounding objects.

11. The non-transitory computer-readable medium of claim 10,
wherein the instructions to communicate the alert include instructions to determine relative positions of the surrounding objects and selecting which of the lights of the subject vehicle to activate according to the positions when communicating the alert.

12. A method of providing a warning from a subject vehicle to surrounding objects about a collision hazard, comprising:
identifying the surrounding objects of the subject vehicle according to sensor data about a surrounding environment of the subject vehicle;
determining a collision probability indicating a likelihood of collision between a first object and a second object of the surrounding objects that are separate from the subject vehicle; and
in response to the collision probability satisfying a collision threshold, communicating, by the subject vehicle, an alert to at least one of the surrounding objects about the collision hazard associated with the surrounding objects colliding by activating lights of the subject vehicle to visibly communicate the alert to the at least one of the surrounding objects.

13. The method of claim 12, wherein communicating the alert includes determining relative positions of the surrounding objects and selecting which of the lights of the subject vehicle to activate according to the relative positions when communicating the alert.

14. The method of claim 13, wherein activating the lights includes flashing the lights that include at least one of rear lights on the subject vehicle or front lights on the subject vehicle according to a defined pattern,
wherein communicating the alert includes determining a current visibility and activating the lights of the subject vehicle according to whether the current visibility satisfies a visibility threshold, and
wherein determining the current visibility includes identifying at least one of a distance of the surrounding objects to the subject vehicle and a time of day.

15. The method of claim 12, wherein determining the collision probability includes i) estimating a first position of the first object and a second position of the second object at a future point in time as a function of at least current velocities and current positions of the first object and the second object, ii) determining a proximity of the first position and the second position, and iii) defining a collision component of the collision probability according to the proximity,
wherein the collision component indicates a likelihood of the first object and the second object colliding at the future point in time.

16. The method of claim 15, wherein defining the collision component includes determining which of a set of proximity zones the proximity is within, wherein a first zone of the set is associated with the proximity indicating that the first position and the second position are overlapping within areas of the first object and the second object, and at least a second zone of the set is associated with the proximity satisfying a danger threshold indicating the first object and the second object are closely passing.

17. The method of claim 12, further comprising:
determining one or more blind spots associated with visible areas of the subject vehicle that are not perceived by one or more of the surrounding objects;
determining whether the surrounding objects are within or are to pass through the one or more blind spots; and
defining a blind spot component of the collision probability according to whether the surrounding objects are to pass through the one or more blind spots.

18. The method of claim 17, wherein defining the blind spot component includes determining whether one of or both of the surrounding objects are to pass through the one or more blind spots, and
wherein determining the one or more blind spots includes determining whether the subject vehicle causes a blind spot in relation to at least one of the surrounding objects.

19. The method of claim 17, wherein determining the one or more blind spot includes identifying types for the surrounding objects and defining shapes of the one or more blind spots according to at least the types,
wherein the types include at least pedestrian, motorcycle, automobile, and truck, and
wherein the shapes are separately modeled according to the types to define perceivable areas of the surrounding objects, the one or more blind spots defining areas that at least one of the surrounding objects cannot perceive.

20. The method of claim 12, wherein the surrounding objects are vehicles, wherein the sensor data includes at least radar returns from a radar sensor of the subject vehicle, and wherein communicating the alert includes adapting when the alert is communicated according to at least one of: detecting one of the vehicles has activated lane change indicators, and detecting movement of at least one of the vehicles corresponding with a lane change.

* * * * *